(12) United States Patent
Allen

(10) Patent No.: US 6,226,288 B1
(45) Date of Patent: May 1, 2001

(54) SUB-RATE SWITCHING TELECOMMUNICATIONS SWITCH

(75) Inventor: James F. Allen, Sandwich, MA (US)

(73) Assignee: Excel Switching Corporation, Hyannis, MA (US)

(*) Notice: Subject to any disclaimer, the term of this patent is extended or adjusted under 35 U.S.C. 154(b) by 0 days.

(21) Appl. No.: 08/926,745

(22) Filed: Sep. 10, 1997

(51) Int. Cl.[7] .................................................. H04Q 11/04
(52) U.S. Cl. ............................................. 370/376; 370/362
(58) Field of Search .................................. 370/375, 376, 370/377, 423, 503, 362

(56) References Cited

U.S. PATENT DOCUMENTS

| | | | |
|---|---|---|---|
| 4,460,806 | * 7/1984 | Canniff et al. | 379/386 |
| 4,472,798 | * 9/1984 | Hafer | 370/376 |
| 5,349,579 | 9/1994 | Madonna et al. | 370/58.2 |
| 5,381,406 | * 1/1995 | Yamashita | 370/376 |
| 5,497,373 | * 3/1996 | Hulen et al. | 370/259 |
| 5,544,163 | 8/1996 | Madonna | 370/60.1 |
| 5,590,129 | * 12/1996 | Ardon | 370/376 |
| 5,852,604 | * 12/1998 | Cooley et al. | 370/324 |

FOREIGN PATENT DOCUMENTS

| | | | |
|---|---|---|---|
| 0 483 516 | 5/1992 | (EP) | H04Q/11/08 |
| 09 116939 | 5/1997 | (JP) | H04Q/3/58 |
| WO 97 27720 | 7/1997 | (WO) | H04Q/11/08 |

* cited by examiner

Primary Examiner—Chau Nguyen
Assistant Examiner—Jasper Kwoh
(74) Attorney, Agent, or Firm—Cesari and McKenna, LLP

(57) ABSTRACT

A telecommunications switch includes a plurality of digital signal processing modules resident on a communications services card, wherein each module includes its own time slot interchange (TSI). Significantly, this allows each digital signal processing module to simultaneously receive all information transmitted from the line cards. In addition, since each digital signal processing module includes its own dedicated TSI and each of these TSIs is connected in parallel to the same TDM bus, one or more TSIs may simultaneously output data onto the TDM bus during a time slot. Advantageously, this allows multiple TSIs to be assigned to the same transmit time slot and mux transmit time slots at the bit level. For example, if a first TSI on the digital signal processing module needs only three bits of an eight bit time slot, and a second TSI needs five or less bits, then both TSIs can be assigned to transmit during the same time slot. The first TSI would output data on, for example, the three least significant bits, while the second TSI would output its data onto the remaining bits of the time slot.

24 Claims, 4 Drawing Sheets

SUB-RATE SWITCHING TELECOMMUNICATIONS SWITCH

CROSS-REFERENCES TO RELATED PATENTS

The following commonly-owned patents are related to the present invention and are hereby incorporated by reference:

U.S. Pat. No. 5,544,163, entitled "Expandable Telecommunications System,"; and

U.S. Pat. No. 5,349,579, entitled "Telecommunications Switch With Programmable Communications Services".

TECHNICAL FIELD

The present invention relates generally to the field of telecommunications and, more specifically, to a programmable telecommunication switch having programmable cards which dynamically provide call processing and communications services to any port in the switch.

BACKGROUND OF THE INVENTION

Conventional digital telecommunications switches often employ a time slot interchange (TSI) to effect switching using time division multiplexing (TDM) techniques. As known, a conventional TSI includes a memory device for storing digital information (i.e., voice, data, etc.), a counter and a control store. The counter cyclically generates consecutive addresses which are applied to the memory device. As each such address is applied to the memory device, a portion of digital information, known as a time slot (i.e., a byte) is stored in the location of the memory device corresponding to that address. In general, in prior art telecommunications switches each time slot is associated with a single, unique "port" of the switch, wherein each port represents a possible connection for a telephone line, trunk or other device.

The switching function is effected by the control store, which generates addresses simultaneously with the counter. However the addresses generated by the control store may be dynamically changed and are generally not consecutive. Thus, as these reordered addresses are applied to the TSI memory device during a read operation, the effect is to switch or interchange the order in which the previously stored information is retrieved from the memory device. In this fashion, information which is stored in the memory device after being received from any given port during a particular time slot may be subsequently read from the memory and transmitted to any other port during another time slot.

In addition to the basic time switching function just described, many digital telecommunications switches provide communications or call processing services. Such services typically include tone generation and tone detection, and other known services to meet the requirements of a particular system application.

A conventional technique for providing call processing services is to configure a switch with the necessary dedicated circuitry (e.g., one or more tone generators and one or more tone receivers of the appropriate protocols) and use the TSI to establish communication paths between such dedicated circuitry and the appropriate ports. For example, assume that a user lifts her handset and the switch detects that her line is now off-hook. The switch then responds by establishing a communication path through the TSI between an available tone generator and the off-hook line, and consequently, a dial tone produced by the tone generator is heard by the user.

There are, however, significant disadvantages with this conventional technique and a solution to those problems is articulately set forth in U.S. Pat. No. 5,349,579 entitled "Telecommunications Switch With Programmable Communications Services" (hereinafter the "'579 Patent"), assigned to the assignee of the present invention and incorporated herein by reference. Although the dynamic allocation of resources disclosed in the '579 Patent is a significant advancement in the state-of-the-art, the system disclosed therein switches or processes only whole time slots (e.g., an entire byte) of information. That is, during each time slot, pulse code modulated (PCM) data is written into and read from the TSI by the digital signal processing modules byte-per-byte. One aspect of this architecture is that only a single DSP can use each time slot. That is, even if a DSP wishes to use less than a byte of a time slot, the entire byte is effectively committed to the DSP. Therefore, several bits of the byte would not be used during the time slot.

With the emergence of digital wireless services and the expansive features available with these services, dedicating an entire time slot to a DSP may be inefficient if a number of the DSPs are using less than the entire byte of the time slot.

SUMMARY OF THE INVENTION

An object of the present invention is to provide a programmable telecommunications switch which allows switching and processing of units of information ranging in size from a single bit to an entire time slot.

Briefly, according to the present invention, a programmable telecommunications switch includes a CPU/matrix card, one or more line cards, and one or more programmable communications services cards, all of which are connected in communicating relationship. The CPU/matrix card includes a time slot interchange (TSI), whose time slots correspond to ports of the switch, and a central call processor which processes messages received from a host computer and controls the line cards and the communications services cards. Each communications services card is independently programmable and processes messages received from the CPU/matrix card. The communications services card includes a plurality of digital signal processor (DSP) modules which are capable of being dynamically programmed to meet the requirements of a particular application.

The CPU/matrix card, the line cards and the communications services cards are interconnected via a plurality of buses which allows messages to be bi-directionally passed between the cards. Specifically, the CPU/matrix card and communications services cards are connected to a TDM bus, such that, these cards continuously receive all PCM information transmitted from the line cards during all time slots. However, during any given time slot, one and only one of the CPU/matrix card or available communications services cards is permitted to transmit PCM information to the line card having the port associated with that given time slot. Thus, for any given time slot, the PCM information that is transmitted to the corresponding port will originate from either the TSI on the CPU/matrix card, or from the communications services cards. As a result of this arrangement, the communications services cards are able to transmit PCM information directly to the line cards (ports) via the TDM bus without occupying time slots that would otherwise be available for other calls.

Preferably, each of the DSP modules resident on a communications services card includes its own TSI.

Significantly, this allows each DSP module to simultaneously receive all information transmitted from the line cards. In addition, since each DSP module includes its own dedicated TSI and each of these TSIs is connected in parallel to the same TDM bus, one or more TSIs may output data onto that bus during a time slot. Advantageously, this allows multiple communication services card TSIs to be assigned to transmit during the same time slot. For example, if a first DSP module needs only three bits of an eight bit time slot, and a second DSP module needs five or less bits, then both DSP modules can be assigned to transmit during the same time slot. The first TSI would output data as, for example, the three least significant bits, while the second TSI would output its data as the remaining bits of the time slot. Advantageously, this provides the telecommunications switch with an ability to "sub-rate" multiplex time slots at the bit level. This system further facilitates the use of variable length PCM or other data.

These and other objects, features and advantages of the present invention will become more apparent in light of the following detailed description of preferred embodiments thereof, as illustrated in the accompanying drawings.

DESCRIPTION OF A PREFERRED EMBODIMENT

Figure 1:
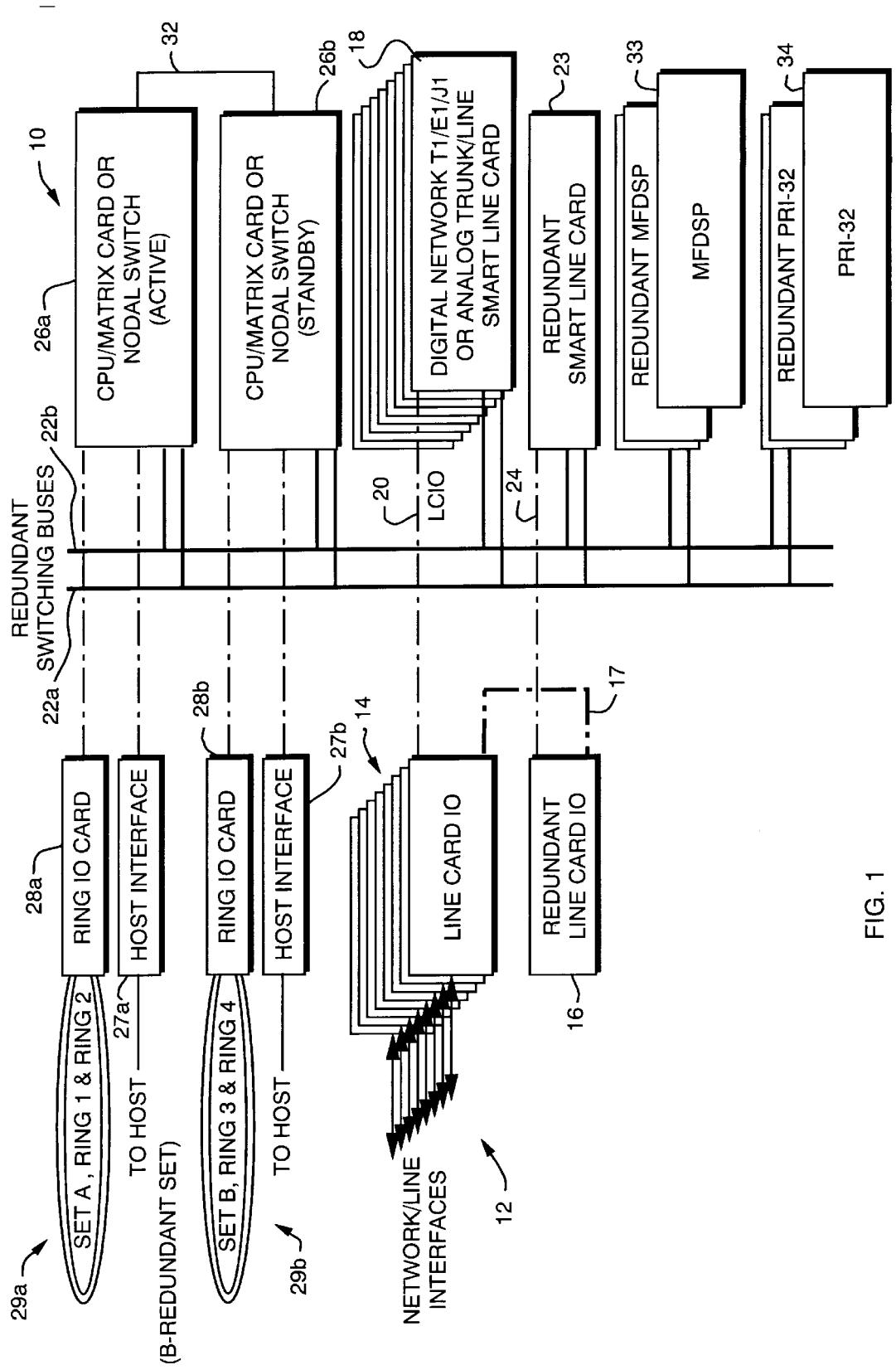
FIG. 1 is a block diagram of a sub-rate switching telecommunications switch.

FIG. 1 shows the major functional components of a preferred embodiment of a programmable telecommunications switch 10 in which the present invention may be implemented. Network/line interfaces 12, which may represent links to a public switched telephone network (PSTN) or private network (or both), are provided on a series of line card input/output (IO) cards 14. If desired, a redundant IO card 16 and redundant IO bus 17 may optionally be provided to permit continued operation of the switch in the event of a failure of one of the IO cards 14.

One or more digital network (T1, E1 or J1) or analog trunk/line line cards 18 communicate with the IO cards 14 over line card (LC) IO lines 20. The line cards are also connected in communicating relationship with redundant switching buses 22a and 22b. Again, if desired, one or more redundant line cards 23 may be provided, such redundant line cards arranged to communicate with the redundant IO card 16 over redundant LC IO lines 24. It should be understood that by providing other types of cards within the switch 10, other types of communication protocols such as DS3, SONET, SS7 or others may also be supported by the switch 10.

Control of the operations of switch 10, as well as the actual switching functions, are performed by either a CPU/matrix card or nodal switch 26a. If a CPU/matrix card is selected, the switch 10 operates as a stand-alone device (i.e., as opposed to operating as a switching node in an expandable telecommunications system). In that case, the CPU/matrix card is connected to a host interface 27a through which communications with an external host device (not shown) are effected.

Alternatively, if a nodal switch is selected, the switch 10 may operate as a switching node in an expandable telecommunications system. In such an [em]bodiment, the nodal switch is preferably connected with a ring IO card 28a through which communications with a pair of fiber optic rings 29a are effected. The nodal switch may also communicate with an external host via the host interface 27a.

Regardless of whether a CPU/matrix card or a nodal switch is selected, a matching standby CPU/matrix card or nodal switch 26b may optionally be provided and accompanied by the appropriate host interface 27b or ring IO card 28b (or both). In such a configuration, a link 32 is provided for direct communication between active and standby devices 26a and 26b.

Details of the construction and operation of a suitable CPU/matrix card may be found in U.S. Pat. No. 5,349,579, incorporated by reference above. Similarly, details of the construction and operation of a suitable nodal switch may be found in U.S. Pat. No. 5,544,163, also incorporated by reference above.

Diverse, programmable communications services such as tone detection and generation, conferencing, voice recorded announcements, call progress analysis, speech recognition, ADPCM compression and many others may be provided by one or more multifunction digital signal processing (MFDSP) cards 33. ISDN Primary Rate service and other packet communications services are provided by one or more PRI-32 packet engine cards 34. Redundant MFDSP cards 33 and redundant PRI-32 cards 34 may also be included.

Figure 2:
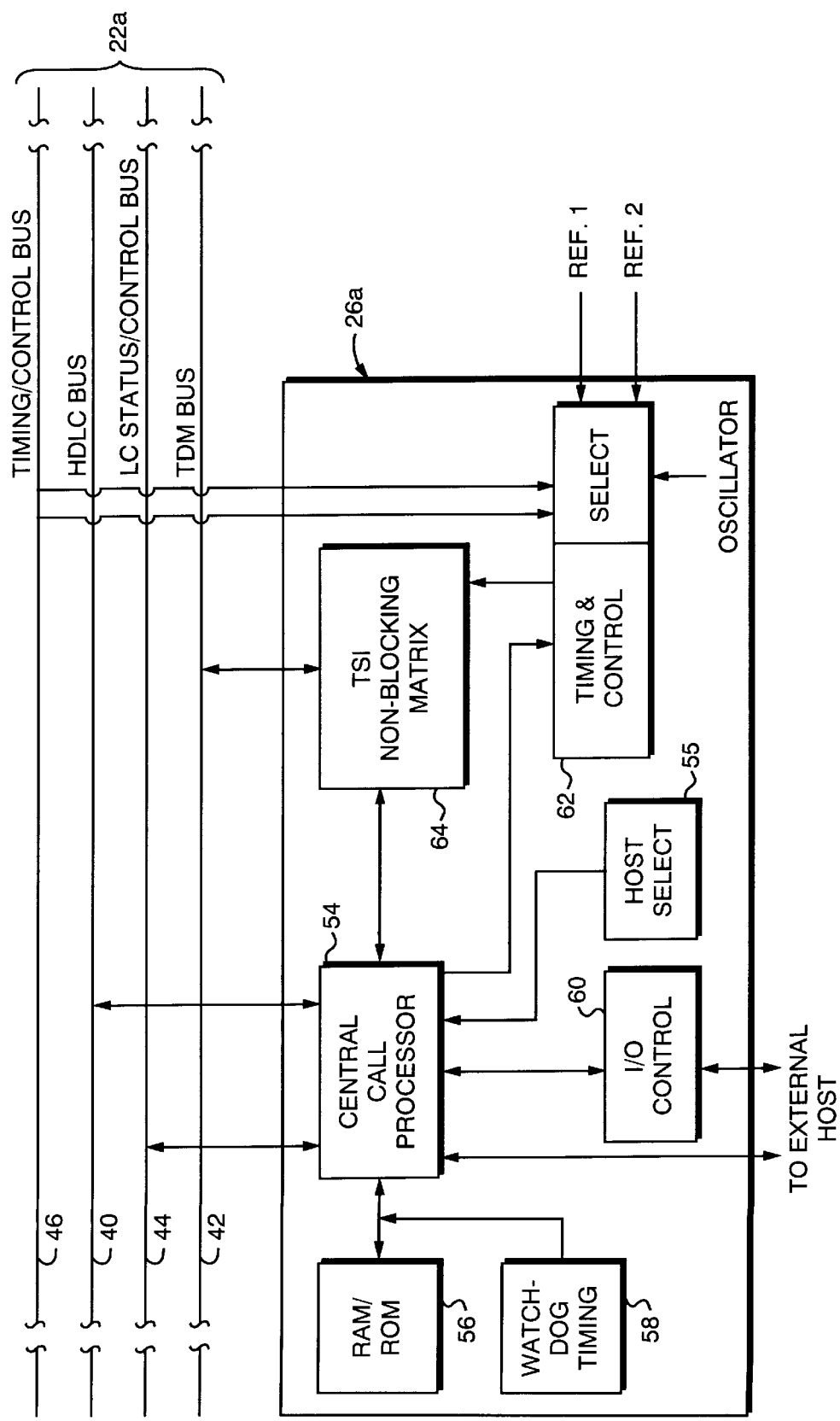
FIG. 2 is a block diagram of a CPU/matrix card resident in the telecommunications switch of FIG. 1.

FIG. 2 is a schematic block diagram illustration of the CPU/matrix card 26a. A central call processor 54 is connected to the switching buses 22a, which includes a high speed data link control (HDLC) bus 40 and a line card LC status/control bus 44. The central call processor 54 is also connected with host select circuitry 55, random access and read only memories 56, watchdog timing circuitry 58, input/output (I/O) control circuitry 60, timing and control/select circuitry 62 and a time slot interchange (TSI) 64. Timing and control/select circuitry 62 is connected to the TSI 64, a timing/control bus 46 (for loop timing) and to a plurality (e.g., three) of sources of timing signals, denoted as signals REF 1, REF 2 (which may be supplied by external sources for reference timing) and OSCILLATOR (which may be supplied by a free running oscillator located on the CPU/matrix card 26a), respectively.

The central call processor 54, which includes for example a Motorola 68302 microprocessor, has control over all of the other circuitry on the CPU/matrix card 26a. The central call processor 54 runs under a real time operating system such as SOS®, sold by Integrated Systems, and uses Q.931-like messages, a CCITT standard protocol, for communicating over the HDLC bus 40. Using the HDLC bus 40, the central call processor 54 may transmit a message simultaneously to all cards connected to that bus. The processor 54 may use the LC status/control bus 44 to select a particular card to transmit a message over the HDLC bus 40. The host select circuitry 55 informs the processor 54 whether to communicate with the internal host or the external host upon power-up.

I/O control circuitry 60 manages communication between the central call processor 54 and an external host (not shown).

Timing and controlselect circuitry 62, as described further below, operates in response to instructions from the central call processor 54 to select one of five available signals for synchronizng the CPU/matrix card 26*a*. Two such signals are provided by the timing/control bus 46, the other three being signals REF 1, REF 2 and OSCILLATOR.

The TSI 64 is preferably a non-blocking matrix which receives incoming PCM data via a TDM bus 42 and operates, as directed by the central call processor 54, to interchange time slots in a conventional manner as a digital memory time switch.

Figure 3:
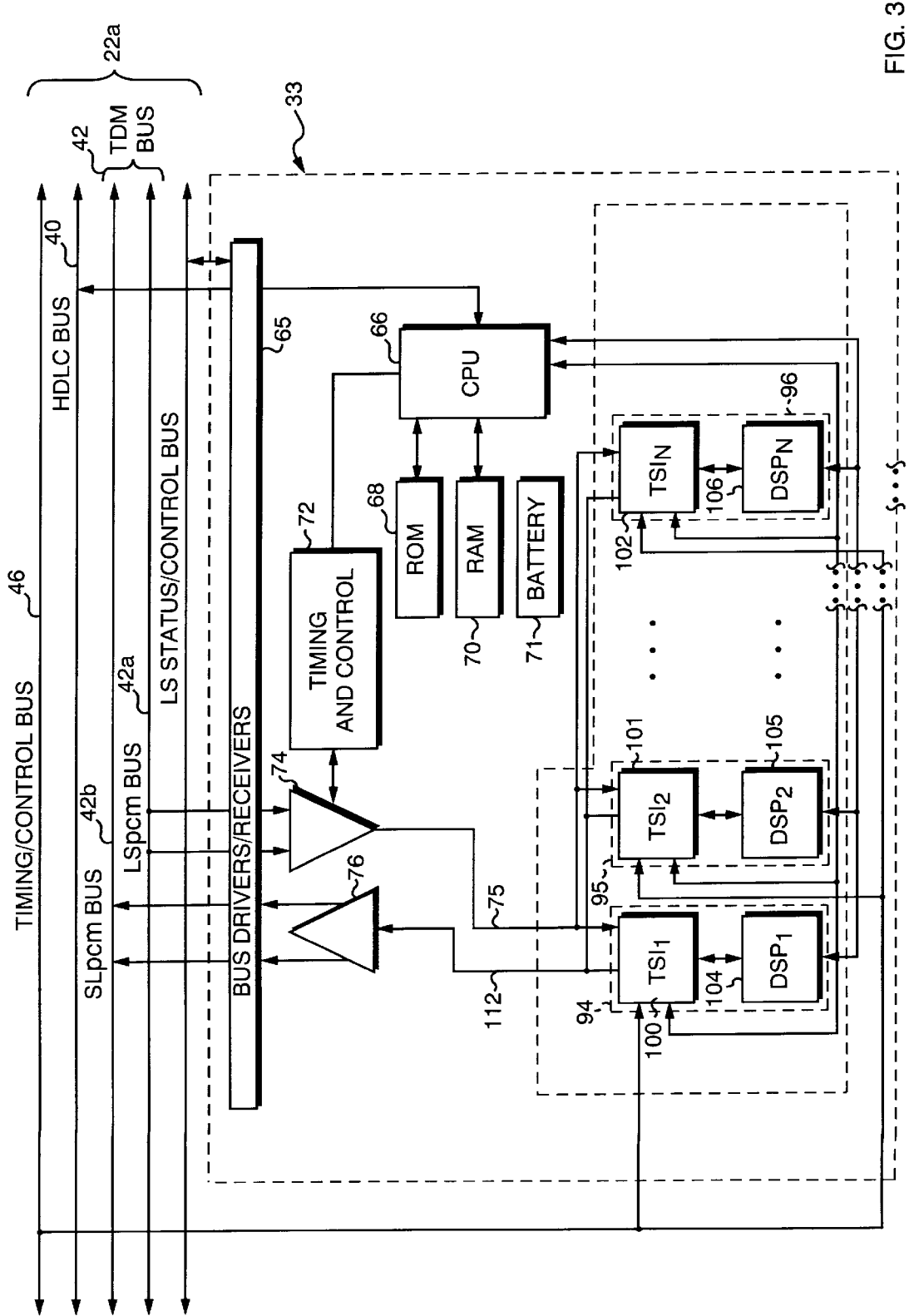
FIG. 3 is a block diagram of a communications services card resident in the telecommunications switch of FIG. 1.

FIG. 3 is a block diagram illustration of the MFDSP card 33. The card 33 includes a series of bus drivers/receivers 65 which interface with the HDLC bus 40, the TDM bus 42 and the LC status/control bus 44. The bus drivers/receivers 65 preferably have open collector outputs since the MFDSP card 33 shares the TDM bus 42 with the CPU/matrix card 26*a*, the line cards 14, 18 and the packet engine card 34. Thus, the use of drivers/receivers 65 having open collector outputs permits the appropriate cards to be connected directly to the TDM bus 42. Some or all of the buses 40, 42 and 44 may be duplicated for the purpose of providing redundancy.

Each TDM bus 42 provides two communication paths designated "LSpcm" and "SLpcm". LSpcm path 42*a* carries PCM information from the line cards 14, 18 to the CPU/matrix card 26*a*, the MFDSP card 33 and the packet engine card 34. Conversely, the SLpcm path 42*b* carries PCM information from the CPU/matrix card 26*a*, the MFDSP card 33 and the packet engine card 34 to the line cards 14, 18. In a preferred embodiment, two eight bit parallel buses are used for the LSpcm and SLpcm paths 42*a*, 42*b*, respectively. Alternatively, those paths may be provided by a plurality of multiplexed serial buses, each of which carries a plurality of time slots. It should be understood that the TDM bus 42 may be implemented using other types and configurations of buses to establish appropriate communications between the various cards.

A CPU 66 (e.g., a Motorola 68302 microprocessor), interfaces with the HDLC bus 40, as well as read only memory (ROM 68, random access memory (RAM) 70, timing and control circuitry 72 and a plurality of digital signal processing modules 94–96 via a synchronized serial communication path. A battery 71 provides backup power for the RAM 70 so information stored therein is preserved in the event of an interruption of the primary power supply.

Multiplexer 74 passes information from the bus drivers/receivers 65 onto a line 75 which is input to each of the digital signal processor modules 94–96 resident on the MFDSP card. Conversely, multiplexer 76 passes information from each of the digital signal processing modules to the bus drivers/receivers 65.

Significantly, each of the plurality of digital signal processing modules includes a time slot interchange (TSI) 100–102 and a digital signal processor 104–106 (e.g., a Texas Instruments model number TI-320C31 operating at 25 MHz) operatively connected to the CPU 66. According to the present invention, each of the plurality of digital signal processing modules 94–96 includes its own TSI 100–102, respectively. Significantly, this allows each module to simultaneously receive all information transmitted from the line cards 34, 38 (FIG. 1). In addition, since each digital signal processing module includes its own dedicated TSI and each of these TSIs is connected in parallel to the same bus, one or more TSIs may output data onto the TDM bus 42 during a single time slot. Advantageously, this allows multiple TSIs 100–102 to be assigned to the same transmit time slot.

Each TSI preferably has a memory capacity of at least 8 bits×4K. However, one of ordinary skill will recognize that other size memory devices may also be used, depending upon for example the overall system design and the requirements of a particular applications.

The general operation of the MFDSP card 33 will now be briefly described. The CPU 66 has overall control of the other components and modules located on the MFDSP card 33. The CPU 66 receives messages from and transmits messages to the central call processor 54 (on the CPU/matrix card 26*a*) via the HDLC bus 40. Messages sent from the central call processor 54 to the CPU 66 are typically used to instruct that certain action be performed. Messages sent from the CPU 66 to the central call processor 54 are typically used to report that certain actions have been carried out.

Figure 4:
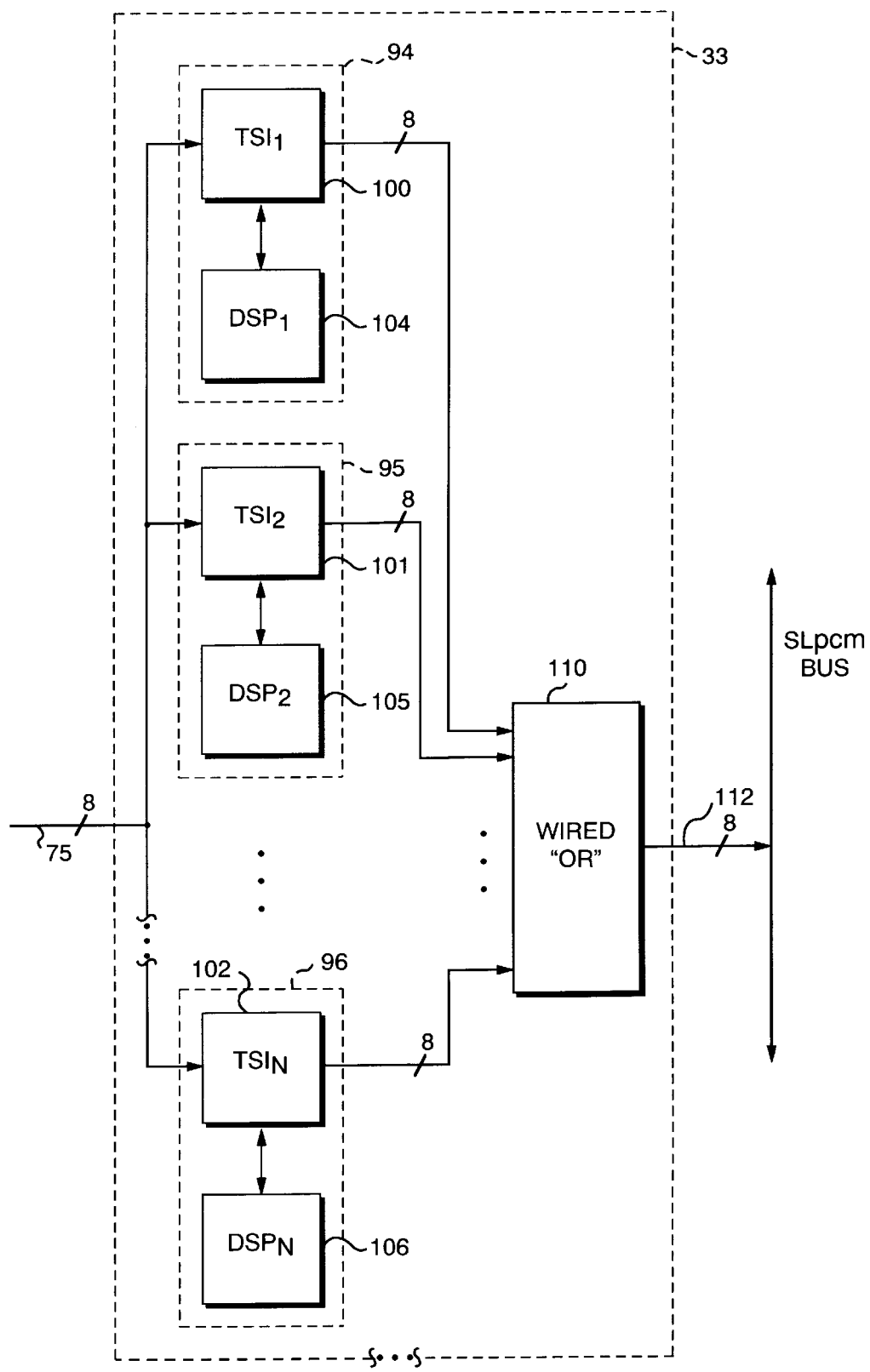
FIG. 4 is a schematic block diagram of a portion of the communications services card comprising a plurality of parallel DSP modules each including a TSI.

The MFDSP card 33 is synchronized with the CPU/matrix card 26*a* by virtue of timing signals received via the timing/control bus 46. Consequently, each of the TSIs 100–102 are connected to continuously receive (via the LSpcm bus 42*a*) the PCM data transmitted from the line cards 14, 18. Thus, PCM data transmitted from any of the line cards 14, 18 is simultaneously stored in corresponding memory locations within the CPU/matrix card TSI 64 (FIG. 2) and within the plurality of MFDSP card TSIs 100–102 (FIGS. 3 and 4).

Once data is stored in the TSIs 100–102 of the programmable digital signal processing modules 94–96, the data may be processed (i.e., operated upon) by the digital signal processors 104–106. The programmable processing may include the functions such as tone generation or detection, call progress analysis, playback of a recorded announcement, speech recognition, ADPCM compression, conferencing, ISDN call control and any other known signal processing associated with both wireline and wireless systems, such as cellular and PCS systems.

During any given time slot, one and only one of the CPU/matrix card 26*a*, the MFDSP card 33 and the packet engine card 34 is permitted to transmit PCM data over the TDM bus 42 to the line cards 14. The selection of which of the cards is permitted to transmit PCM data is directed by the central call processor 54 through an exchange of messages over the HDLC bus 40.

For a given time slot, if the MFDSP card 33 is not selected to transmit PCM data, then the TSIs 100–102 each output a predetermined bit pattern (e.g., FF hex), which effectively turns off the drivers/receivers 65. Thus, for the given time slot, the MFDSP card 33 will have no effect on the TDM bus 42.

FIG. 4 is a schematic block diagram of a portion of the MFDSP card comprising DSP modules 94–96 which include associated TSIs 100–102 and DSPs 104–106. Each of the modules 94–96 transmits data onto a MFDSP card bus 110, which is represented functionally as a wired "OR", all lines of which are preferably electrically pulled up. Specifically, one or more digital signal processing modules 94–96 may simultaneously transmit bits of information onto the MFDSP card bus 110, which information is effectively combined into a single eight bit time slot on the TDM bus 42 (i.e., the SLpcm bus).

Advantageously, the present invention facilitates performance of various functions including sub-rate multiplexing and vocoding functions which find particular utility in PCS (i.e., wireless communications systems). For example, it may be desirable in a PCS system to use four bit voice samples, rather than the eight bit samples commonly used in wireline systems (e.g., PSTN systems), for purposes of more efficiently using the system bandwidth (e.g., the RF bandwidth). In this case, eight bit time slots received from the PSTN for transmission to a wireless subscriber must first be vocoded (i.e., compressed) to four bits. This is accomplished by the present invention, receiving such eight bit samples from one of the line cards 14, 18 (FIG. 1) via the LSpcm bus 42. For a given call, such eight bit samples will be stored in all the TSI circuits 100–102 as described above. Generally, only one of the DSPs 104–106 will be assigned (e.g., DSP 104) to process the received eight bit samples in accordance with a predetermined compression algorithm in order to reduce each such sample to, for example, a four bit value. Likewise, DSP 105 may be assigned to perform a similar compression function with respect to other eight bit samples associated with other calls received over the LSpcm bus. In contrast, DSP 106 may be programmed to decompress four bit samples received by the switch 10 from a wireless subscriber and destined for the PSTN.

After DSP 104 has performed the compression function, the resulting four bit sample is stored in the TSI 100. Subsequently, in synchronism with an appropriate (eight bit) time slot on SLpcm bus 42, that four bit sample is read from TSI 100 and placed on that bus. The remaining four bits of that time slot may be used to carry a previously compressed four bit sample (or any other information less than four bits) which relates to a different call. In this fashion, the present invention effectively allows a telecommunications switch to handle twice the number of calls that otherwise could be handled using conventional switching techniques employing dedicated eight bit time slots. However, one of ordinary skill will recognize that the present invention is not limited to operating within switching systems which compress eight bits to four bits, or decompress four voice samples to eight bit samples. Rather, the present invention is capable of a time switching function for any size unit of information, starting from a single bit up to and including an entire time slot (e.g., a byte), provided that a sufficient number of DSP modules are present and available.

It should be understood that the scope of the present invention is not limited to telecommunication switching systems populated with programmable digital signal processing cards as disclosed herein. Rather, the sub-rate switching provided by the present invention can be incorporated into a variety of communication devices. For example, each of the parallel configured TSIs do not have to be associated with a digital signal processing chip and one of ordinary skill in the art will recognize that there are a number of switching system designs capable of enjoying the advantages of muxing time slots at the bit level (i.e., sub-rate switching) according to the present invention.

In addition, although obvious to one of ordinary skill, the present invention is clearly not limited to systems operating at the clock speeds or bus widths or bus types disclosed herein. Rather it is contemplated that systems employing various clock speeds and bus widths and types may attain some or all of the advantages of the present invention.

Although the present invention has been shown and described with respect to several preferred embodiments thereof, various changes, omissions and additions to the form and detail thereof, may be made therein, without departing from the spirit and scope of the invention.

What is claimed is:

1. A communications services card for use in a telecommunications switch or a node of a telecommunications system, and said telecommunications switch including controllable switching means for dynamically connecting or disconnecting communications paths between various ones of a plurality of ports in response to messages generated by a host, including a time slot interchange (TSI) for switching a plurality of time slots corresponding to said ports and means for processing said messages, said controllable switching means being in communicating relationship with a TDM bus, one or more means for terminating either analog or digital lines or trunks which represent said ports and said means connected to said bus, and said bus having a first path for carrying information from said controllable switching means to said means for terminating and a second path for carrying information from said terminating means to said controllable switching means, the communications card comprising:

a plurality of digital signal processing modules, each capable of processing data organized as inbound time slots and each receiving data by a time slot interchange (TSI) circuit with which it is paired and into which the received data is stored, the TSI circuits being disposed in parallel to one another, and in communicating relationship with said TDM bus, wherein the TSI circuits store the received data and each TSI circuit transmits a selectable amount of an outbound time slot, destined for any of said ports, of processed data; and a timing and control bus, connected in communicating relationship with each of the modules, for controlling the storing of the received data in the plurality of TSI circuits, and the transmission of data from the TSI circuits on to the TDM bus, whereby a predetermined amount of a time slot transmitted from a TSI circuit is placed in a portion of a time slot corresponding to the number of bits of said amount of said outbound time slot and destined for one of said plurality of ports, such that information is capable of being processed on a bit-by-bit basis.

2. The communications services card of claim 1, further comprising a plurality of digital signal processors, each digital signal processor being operatively connected in a communicating relationship with one of the TSI circuits and with a central processing unit, to perform programmable data processing functions on the data stored in the TSI circuits.

3. The communications services card of claim 2 wherein said programmable data processing functions comprises one of subrate switching, tone generation, tone detection, call progress analysis, playback of a recorded announcement, speech recognition, compression, conferencing, ISDN call control, or vocoding.

4. The communications services card of claim 2 wherein the selectable amount of the outbound time slot is in the range of zero to a maximum number of bits contained in the outbound time slot.

5. The communications services card of claim 2 wherein the plurality of TSI circuits comprises eight TSI circuits, and wherein the plurality of digital signal processors comprises eight digital signal processors.

6. The communications services card of claim 5 wherein a first processing group comprises one of the eight TSI circuits and one of the eight digital signal processors for performing a first data processing function on four bits of an inbound time slot, and wherein a second processing group comprises a second one of the eight TSI circuits and a second one of the eight digital signal processors for performing a second data processing function on a second four bit signal.

7. The communications services card of claim 5 wherein a first processing group comprises four of the eight TSI circuits and four of the eight digital signal processors for performing a first data processing function on four bits of an inbound time slot, and wherein a second processing group comprises the remaining four of the eight TSI circuits and the remaining four of the eight digital signal processors for performing a second data processing function on a second four bit signal.

8. The communications services card of claim 1 wherein the telecommunications switch is connected by an intemodal network in a communicating relationship with a plurality of other telecommunications switches or nodes forming a telecommunications system.

9. The communications services card of claim 8 wherein the data received by the TSI circuits is received from the intemodal network, and wherein the data transmitted by the TSI circuits is transmitted to the intemodal network.

10. The communications services card of claim 1 wherein the data received by the TSI circuits is received from one or more line cards, and wherein the data transmitted by TSI circuits is transmitted to one or more line cards.

11. A means for providing communications services in a telecommunications switch or a node of a telecommunications system, the telecommunications switch including controllable switching means for dynamically connecting or disconnecting communications paths between various ones of a plurality of ports in response to messages generated by a host, including a time slot interchange (TSI) for switching a plurality of time slots corresponding to said ports and means for processing said messages, said controllable switching means being in communicating relationship with a TDM bus, one or more means for terminating either analog or digital lines or trunks which represent said ports and said means connected to said bus, and said bus having a first path for carrying information from said controllable switching means to said means for terminating and a second path for carrying information from said terminating means to said controllable switching means, the communications service means comprising a single card, the single card further comprising:

means for receiving the inbound time slots, in parallel, from said bus, at a plurality of means for storing the inbound time slots, and being in communicating relationship with said TDM bus;

means for performing data processing on the inbound time slot at each one of the plurality of time slot storing means to provide processed data;

means for providing the processed data from each one of the data processing means as a selectable amount of an outbound time slot destined for any one of said ports onto said bus; and means, connected in communicating relationship with each of the inbound time slot receiving means and each of the processed data providing means, for controlling the storing of the inbound time slot and the transmission of the outbound time slot to any one of said plurality of ports.

12. The communications services means of claim 11, wherein said means for performing data processing further comprises means for performing one or more of subrate switching, tone generation, tone detection, call progress analysis, playback of recorded announcements, speech recognition, compression, conferencing, ISDN call control, or vocoding.

13. The communications services means of claim 11, wherein the plurality of means for storing the inbound time slot comprises eight means for storing the inbound time slot and wherein the means for performing data processing on the inbound time slot comprises eight means for performing data processing on the inbound time slot.

14. The communications services means of claim 11 further comprising means for communicating with a plurality of telecommunications switches or nodes forming a telecommunications system.

15. A method for providing communications services on a single card in a telecommunications switch or a node of a telecommunications system, the telecommunications switch having controllable switching means for dynamically connecting or disconnecting communications paths between various ones of a plurality of ports in response to messages generated by a host, including a time slot interchange (TSI) for switching a plurality of time slots corresponding to said ports and means for processing said messages, said controllable switching means being in communicating relationship with a TDM bus, one or more means for terminating either analog or digital lines or trunks which represent said ports and said means connected to said bus, and said bus having a first path for carrying information from said controllable switching means to said means for terminating and a second path for carrying information from said terminating means to said controllable switching means, including the steps of:

(A) providing the single card with a plurality of digital signal processing modules, each module comprising a time slot interchange and a programmable data processor, and the time slot interchange of each module being connected in a parallel communicating relationship to the same time-switched bus;

(B) receiving a first time slot from the time switched bus comprising a plurality of digital signals;

(C. storing the first time slot in each of the time slot interchanges;

(D) performing a programmable data processing function with a selected programmable data processor on one or more of the plurality of digital signals to provide one or more processed digital signals;

(E) storing the one or more processed digital signals in respective time slot interchanges; and (F) transmitting from the time slot interchanges said one or more processed digital signals to the time switched bus into one of said time slots;

whereby multiple communications services card TSIs may be assigned to transmit during the same time slot, providing the telecommunications switch with the ability to accommodate variable lenht PCM data, on a bit-by-bit basis.

16. The method of claim 15 further comprising the step of combining selected ones of the plurality of bits to perform a selected bit length digital signal processing function in a selected one of the plurality of digital signal processing modules.

17. The method of claim 16 further comprising the step of combining four of the plurality of bits to perform a four bit digital signal processing function in the selected one of the plurality of digital signal processing modules.

18. The method of claim 15 further comprising the steps of:

A. performing a plurality of programmable data processing functions in a selected plurality of programmable data processors on one or more of the plurality of bits stored in a selected plurality of time slot interchanges to provide a plurality of processed bits;

B. storing the plurality of processed bits in the selected plurality of time slot interchanges; and C. transmitting from all of the time slot interchanges to the time switched bus the second time slot comprising the plurality of processed bits.

19. A method of vocoding on a single card in a telecommunications or a node of a telecommunications system, the single card having a plurality of digital signal processing modules, each module comprising a time slot interchange and a programmable data processor, the method comprising the steps of:

(A) providing the single card with a plurality of digital signal processing modules, each module comprising a time slot interchange and a programmable data processor, and the time slot interchange of each module being connected in a parallel communicating relationship to the same time-switched bus;

(B) receiving a first time slot comprising a plurality of bits from the time switched bus;

(C storing the first time slot in each of the time slot interchanges;

(D) compressing, with a first programmable data processor associated with a first time slot interchange, the first time slot into one or more compressed bits consisting of fewer bits than the first time slot;

(E) storing the one or more compressed bits in the first time slot interchange; and (F) transmitting, from the time slot interchanges to the time switching bus, a second time slot comprising the one or more compressed bits.

20. The method of claim 19 further comprising the steps of:

A. receiving one or more additional time slots, each addition time slot comprising an additional plurality of bits;

B. compressing each additional plurality of bits into an additional one or more compressed bits;

C. storing each additional one or more compressed bits in an additional time slot interchange; and D. transmitting an outbound time slot comprising the one or more compressed bits and each additional one or more compressed bits.

21. The method of claim 20 wherein each time slot consists of eight bits and each of the one or more compressed bits consists of four compressed bits.

22. A method of vocoding on a single card in a telecommunications switch or a node of a telecommunications system, the single card having a plurality of digital signal processing modules, each module comprising a time slot interchange and a programmable data processor, the method comprising the steps of:

(A) providing the single card with a plurality of digital signal processoring modules, each module comprising a time slot interchange and a programmable data processor, and the time slot interchange of each module being connected in a parallel communicating relationship to the same time-switched bus:

(B) receiving a first time slot from the time switched bus comprising a plurality of bits;

(C storing the first time slot in the time slot interchanges;

(D) decompressing, with a first programmable data processor associated with the first time slot interchange, selected ones of the plurality of bits into a plurality of decompressed bits consisting of more bits that the selected ones of the plurality of bits; and (E) transmitting, from the first time slot interchange to the time switched bus, and outbound time slot comprising the plurality of decompressed bits.

23. The method of claim 22 further comprising the steps of:

A. decompressing, with one or more additional programmable data processors associated with one or more additional time slot interchanges, additional selected ones of the plurality of bits into additional pluralities of decompressed bits;

B. storing each of the additional pluralities of decompressed bits in one of the time slot interchanges; and C. sequentially transmitting from the one or more additional time slot interchanges to the time switched bus, one or more additional outbound time slots comprising the additional pluralities of decompressed bits.

24. The method of claim 22 wherein the selected ones of the bits consists of four bits and the outbound time slot consists of eight bits.

* * * * *